US008166527B2

(12) United States Patent
Wen et al.

(10) Patent No.: US 8,166,527 B2
(45) Date of Patent: Apr. 24, 2012

(54) OPTIMIZED SECURITY ASSOCIATION DATABASE MANAGEMENT ON HOME/FOREIGN AGENT

(75) Inventors: Renhua Wen, San Ramon, CA (US);
Alfred C. Lindem, III, Cary, NC (US);
Anand K. Oswal, Sunnyvale, CA (US)

(73) Assignee: Ericsson AB, Stockholm (SE)

( * ) Notice: Subject to any disclaimer, the term of this patent is extended or adjusted under 35 U.S.C. 154(b) by 1194 days.

(21) Appl. No.: 11/985,801

(22) Filed: Nov. 16, 2007

(65) Prior Publication Data
US 2009/0133102 A1    May 21, 2009

(51) Int. Cl.
*G06F 21/00* (2006.01)
(52) U.S. Cl. ............... 726/6; 455/435.1; 709/238
(58) Field of Classification Search ............ 709/238; 455/435.1, 436; 726/3, 4, 5, 6
See application file for complete search history.

(56) References Cited

U.S. PATENT DOCUMENTS

| 6,119,214 | A * | 9/2000 | Dirks | 711/206 |
| 6,567,664 | B1 * | 5/2003 | Bergenwall et al. | 455/435.1 |
| 7,269,727 | B1 * | 9/2007 | Mukherjee et al. | 713/160 |
| 7,545,766 | B1 * | 6/2009 | Muhanna et al. | 370/328 |
| 7,843,878 | B2 * | 11/2010 | Morales et al. | 370/331 |
| 2001/0012777 | A1 * | 8/2001 | Igarashi et al. | 455/435 |
| 2002/0080752 | A1 | 6/2002 | Johansson et al. | |
| 2002/0172175 | A1 * | 11/2002 | Okamura | 370/338 |
| 2003/0021275 | A1 * | 1/2003 | Shabeer | 370/393 |
| 2003/0119506 | A1 * | 6/2003 | Singhai et al. | 455/435 |
| 2003/0233361 | A1 * | 12/2003 | Cady | 707/10 |
| 2003/0236905 | A1 * | 12/2003 | Choi et al. | 709/231 |
| 2005/0232429 | A1 * | 10/2005 | Chowdhury et al. | 380/277 |
| 2007/0206557 | A1 * | 9/2007 | Iyer et al. | 370/338 |
| 2007/0274266 | A1 * | 11/2007 | Oyama et al. | 370/335 |

FOREIGN PATENT DOCUMENTS

KR    1020040004329    *  7/2005

OTHER PUBLICATIONS

Certified English translation of Choi et al. (KR 10-2004-0004329), translated by FLS, Inc. for the USPTO, Sep. 2011, 10 pages.*

(Continued)

*Primary Examiner* — Hadi Armouche
(74) *Attorney, Agent, or Firm* — Blakely, Sokoloff, Taylor & Zafman LLP

(57) ABSTRACT

Techniques for security association management on a home and foreign agent are described. In one embodiment, in response to a first mobile network registration request from a mobile node, a remote authentication facility is accessed to retrieve a security association for the mobile node for authenticating and providing a first network connectivity to the mobile node, wherein the security association is associated with a lifespan. The security association is inserted in a local security association database (SADB) to create a security association entry, wherein the security association entry includes the lifespan. A second mobile network registration request from the mobile node after the first connectivity is terminated is received and the security association entry in the local SADB that corresponds to the mobile node is used to provide authentication of the mobile node without having to access the remote authentication facility again if the lifespan associated with the security association entry is valid.

22 Claims, 6 Drawing Sheets

OTHER PUBLICATIONS

Cisco Mobile Wireless Home Agent Feature Guide, Cisco IOS Release 12.3(14)YX, Cisco Mobile Wireless Home Agent 3.0, Dec. 22, 2005.

Debalina Ghosh, "Mobile IP", http://acm.org/crossroads/xrds7-2/mobileip.html, Oct. 29, 2007, pp. 1-11.

Narendra Venkataraman, "Mobile IP lets mobile-device users stay connected when moving to networks with different IP addresses", Sep. 1, 2005, Dr. Dobb's Journal, pp. 1-8.

C. Perkins, Nokia Research Center, P. Calhoun, Cisco Systems, Inc., J. Bharatia, Nortel Networks, Mobile IPv4 Challenge/Response Extensions (Revised) (RFc 4721) Jan. 2007.

C. Perkins, Nokia Research Center, "IP Mobility Support for IPv4", RFC 3344, Aug. 2002.

G. Montenegro, Editor, Sun Microsystems, Inc., "Reverse Tunneling for Mobile IP, revised", RFC 3024, Jan. 2001.

International Search Report and Written Opinion, Application No. PCT/US2008/076086, dated Dec. 1, 2008.

* cited by examiner

SECURITY ASSOCIATION
DATABASE

| NAI | KEY | LIFESPAN | USAGE | STATE |
|---|---|---|---|---|
| Node 1 | Key 1 | 90 out of 90 days | Last used 0 days Ago | Active |
| Node 2 | Key 2 | 30 out of 78 days | Last used 23 days Ago | Idle |
| Node 3 | Key 3 | 15 out of 90 days | Last used 0 days Ago | Active |
| Node 4 | Key 4 | 0 out of 90 days | Last used 45 days Ago | Lifespan Expired |

FIG 3

OPTIMIZED SECURITY ASSOCIATION DATABASE MANAGEMENT ON HOME/FOREIGN AGENT

CROSS-REFERENCE TO RELATED APPLICATIONS

Not Applicable.

BACKGROUND

1. Field

Embodiments of the invention relate to the field of networking; and more specifically, to security association management on a home agent and a foreign agent.

2. Background

Mobile IP is a protocol which allows laptop computers or other mobile computer devices (referred to as mobile nodes herein) to roam between various sub-networks at various locations, while maintaining Internet and/or WAN connectivity. In a typical Mobile IP network, when a mobile node roams from one foreign network to another foreign network, the mobile node has to send a registration request according to a Mobile IP protocol to a foreign agent associated with the foreign network to establish a communication session with a home agent associated with the mobile node.

Before the foreign agent or the home agent provides a mobile node with network connectivity the foreign agent and/or the home agent authenticates the mobile node. Typically this authentication is performed with the use of a security association. A security association typically includes an indication for an authentication algorithm, a key for that authentication algorithm, and also is associated with a lifespan (i.e., the security association will be valid for a certain amount of time).

One prior art technique of managing security associations is to statically configure the security associations at the foreign agent and the home agent. However, this prior art technique has the disadvantage that as the number of subscribers (e.g., mobile nodes) continues to grow and the unpredictability of which subscribers will be hosted (e.g., the nodes are mobile and roam between various networks) this technique is costly to maintain (e.g., memory, processor, disk storage, etc.) and is non-scalable.

Another prior art technique of managing security associations is to use on-demand downloading of the security association from an external authentication, authorization, and accounting ("AAA") server. Upon a mobile IP registration request or a mobile IP re-registration request from a mobile node the security association for that mobile node is downloaded from the AAA server. Typically this security association may be locally cached but is removed after the mobile node's IP connection is deleted. However, this prior art technique has the disadvantage that for every mobile IP registration request or mobile IP re-registration request from a mobile node an external round-trip to the AAA server must be performed. These security authentication requests increases the amount of time necessary to provide IP connectivity for the mobile node, increases network traffic, and burdens the AAA servers. The security association also may be permanently cached on the home agent or foreign agent until manually deleted, but this technique suffers from the disadvantage that as the number of subscribers (e.g., mobile nodes) continues to grow and the unpredictability of which subscribers will be hosted (e.g., the nodes are mobile and roam between various networks) this technique is costly to maintain (e.g., memory, processor, disk storage, man power, etc.).

BRIEF DESCRIPTION OF THE DRAWINGS

The invention may best be understood by referring to the following description and accompanying drawings that are used to illustrate embodiments of the invention. In the drawings:

FIG. 3 is a block diagram illustrating exemplary entries of a security association database according to one embodiment of the invention.

DETAILED DESCRIPTION

Figure 1A:
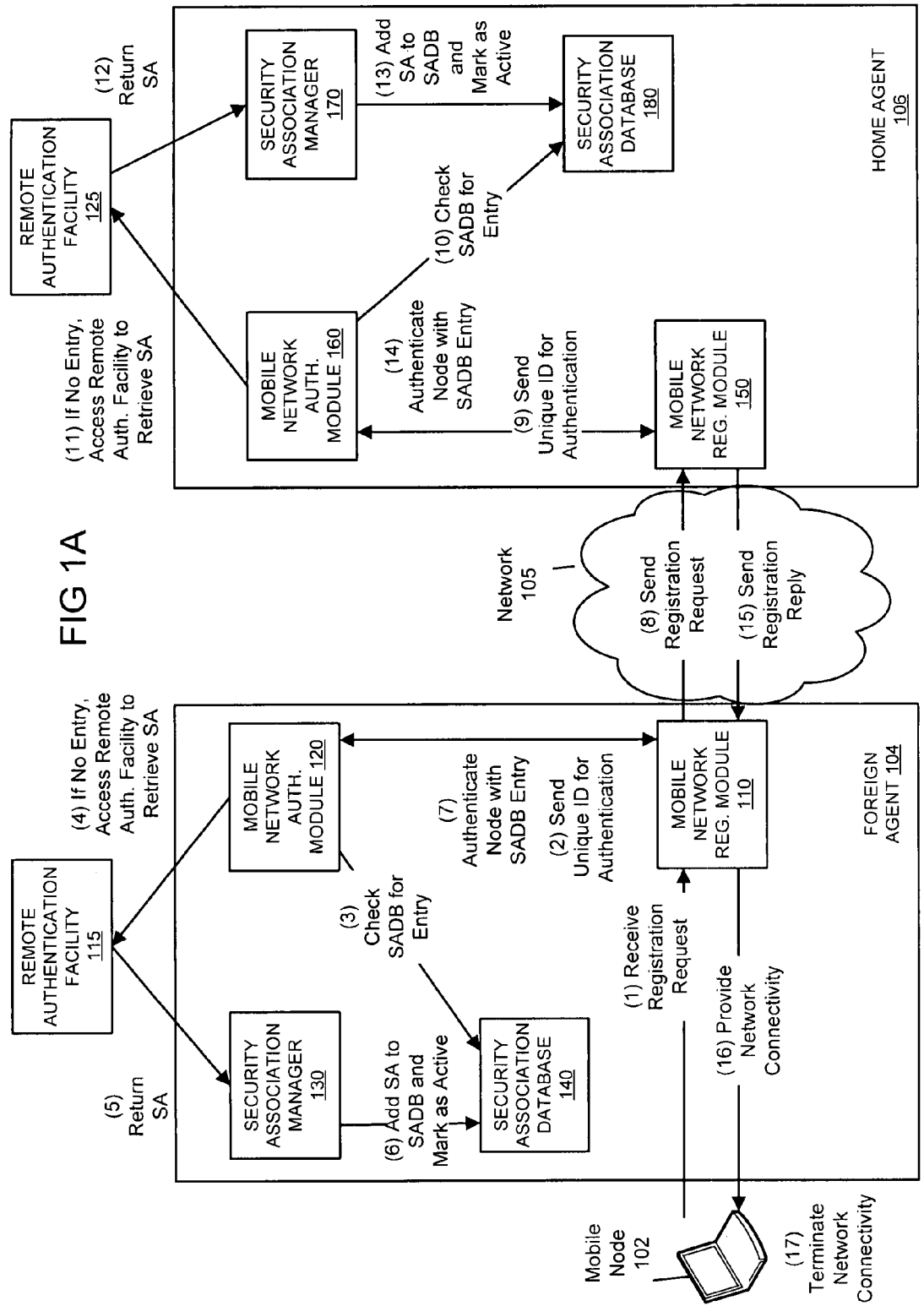
FIG. 1A is a data flow diagram illustrating an exemplary method of authenticating a mobile node upon receiving a registration request according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

A method and apparatus for security association management on a home agent and a foreign agent is described. In one embodiment a security association is received from a remote authentication facility upon a first mobile network registration request from a mobile node to authenticate that mobile node, and each subsequent mobile network registration requests from that mobile node uses that received security association without accessing the remote authentication facility again as long as the security association is valid.

FIG. 1A is a data flow diagram illustrating an exemplary method of authenticating a mobile node upon receiving a registration request according to one embodiment of the invention. It should be understood that while this data flow diagram and other data flow diagrams illustrate operations to be performed, the order in which they can be performed is exemplary and the order may be performed differently by certain embodiments. Referring to FIG. 1A, there is a foreign agent 104 coupled over a network 105 with home agent 106. Network 105 may be a local area network (LAN) or more commonly a wide area network (WAN) such as the Internet. Mobile node 102 is initially registered with home agent 106 (i.e., home agent 106 provides network connectivity to mobile node 102 when mobile node 102 is within its home network). Included within foreign agent 104 is a local security association database ("SADB") 140 that is configured to store a set of one or more security associations. Similarly, included within home agent 106 is a local security association database 180 which is also configured to store a set of one or more security associations. Exemplary entries of the security association databases will be discussed with reference to FIG. 3. While in one embodiment of the invention each of the security association databases is stored in local cache memory, in alternative embodiments of the invention the security association databases are stored differently (e.g., hard disks, flash memory, magnetic tape, optical drives, etc.). Mobile node 102 is currently within the network of foreign agent 104 and desires for foreign agent 104 to facilitate network connectivity.

Mobile network registration module 110 at foreign agent 104 receives a mobile network registration request from mobile node 102 at operation 1. While in one embodiment of the invention the mobile network registration request is a mobile IP registration request, in alternative embodiments of the invention different mobile network registration requests may be received (e.g., for other protocols other than IP). The mobile network registration request also includes a unique identifier of the mobile node (e.g., a network access identifier ("NAI")). In one embodiment of the invention foreign agent 104 is not configured to authenticate a mobile node visiting their network. Rather, upon receiving a mobile network registration request, mobile network registration module 110 forwards the mobile network registration request to mobile network registration module 150 on home agent 106. In another embodiment of the invention, foreign agent 104 is configured to authenticate mobile node 102. Thus, at operation 2, mobile network registration module 110 sends the unique identifier of the mobile node to mobile network authentication module 120 for authentication of that mobile node.

Mobile network authentication module 120 checks security association database 140 for an entry corresponding to the mobile node requesting network registration (e.g., by using the unique identifier, or NAI) at operation 3. If no entry for the mobile node exists in the security association database, then at operation 4 mobile network authentication module 120 accesses a remote authentication facility 115 to retrieve a security association for the mobile node. For example, in one embodiment of the invention the remote authentication facility is an authentication, authorization, and accounting (AAA) server using protocols such as RADIUS or DIAMETER. At operation 5, remote authentication facility 115 returns the security association corresponding with that mobile node.

The received security association is associated with a lifespan that determines the time period in which the security association is valid (i.e., has not expired). While in one embodiment of the invention the lifespan is included with the security association retrieved from remote authentication facility 115, in alternative embodiments of the invention the lifespan is created from a local policy. For example, in one embodiment a local policy defined on foreign agent 104 may take into consideration the system status of foreign agent and the current number of mobile node subscribers before assigning a lifespan to the security association. In another embodiment of the invention the local policy may define the lifespan differently (e.g., based on the type of mobile node, the frequency that the mobile node accesses the foreign network, the service level assigned to the mobile node, etc.). In yet another embodiment of the invention, the lifespan may be included with the received security association and also may be defined in a local policy. In such a conflict, either lifespan may override the other (e.g., the lifespan defined by the local policy may take precedence over the lifespan included with the received security association, or the lifespan included with the received security association may take precedence over the lifespan defined by the local policy).

Security association manager 130 creates an entry in security association database for mobile node 102 (e.g., according to the unique identifier or NAI) and adds the received security association to security association database 140 and marks the security association entry as active at operation 6. In one embodiment of the invention, the security association has a maximum capacity of security association entries where the capacity is defined by a local policy. Thus if the capacity of the security association database is reached, the security association manager 130 may not add the security association to the security association database. More discussion relative to the capacity of the security association database and the actions taken by the security association manager will be discussed with reference to FIG. 4A. The newly created security association entry is used to authenticate mobile node 102 at operation 7.

At operation 8, mobile network registration module sends a mobile network registration request on behalf of the mobile node to mobile network registration module 150 on home agent 106. Included in this mobile network registration request is the unique identifier of the mobile node (e.g., NAI). At operation 9, the mobile network registration module sends that unique identifier to mobile network authentication module 160 to authenticate mobile node 102. At operation 10, mobile network authentication module 160 checks security association database 180 for a security association entry corresponding to that mobile node. If no entry exists, then at operation 11 mobile network authentication module 160 accesses a remote authentication facility 125 to retrieve a security association for the mobile node. For example, in one embodiment of the invention the remote authentication facility is an authentication, authorization, and accounting (AAA) server using protocols such as RADIUS or DIAMETER. At operation 12, remote authentication facility 125 returns the security association corresponding with that mobile node.

Similarly as in the case of foreign agent 104, this received security association is associated with a lifespan that determines the time period in which the security association is valid (i.e., has not expired). While in one embodiment of the invention the lifespan is included with the security association retrieved from remote authentication facility 125, in alternative embodiments of the invention the lifespan is created from a local policy. For example, in one embodiment a local policy defined on home agent 106 may take into consideration the system status of home agent and the current number of mobile node subscribers before assigning a lifespan to the security association. In another embodiment of the invention the local policy may define the lifespan differently (e.g., based on the type of mobile node, the service level assigned to the mobile node, etc.). In yet another embodiment of the invention, the lifespan may be included with the received security association and also may be defined in a local policy. In such a conflict, either lifespan may override the other (e.g., the lifespan defined by the local policy may take precedence over the lifespan included with the received security association, or the lifespan included with the received security association may take precedence over the lifespan defined by the local policy).

Security association manager 170 creates an entry in security association database for mobile node 102 (e.g., according to the unique identifier or NAI) and adds the received security association to security association database 180 and marks the security association entry as active at operation 13. In one embodiment of the invention, the security association has a maximum capacity of security association entries where the capacity is defined by a local policy. Thus if the capacity of the security association database is reached, the security association manager 170 may not add the security association to the security association database. More discussion relative to the capacity of the security association database and the actions taken by the security association manager will be discussed with reference to FIG. 4A. The newly created security association entry is used to authenticate mobile node 102 at operation 14. Although not shown in FIG. 1A, home agent 106 provides network connectivity to mobile node 102 by binding the Care-of-Address (CoA) associated with the mobile node to the mobile node's home address.

At operation 15, the mobile network registration module 150 sends a registration reply to the foreign agent 104 indicating that the mobile node is authorized for access. At operation 16, foreign agent 104 provides network connectivity to mobile device 102. The network connectivity is terminated at operation 17. Network connectivity may be terminated by any number of ways. For example, the mobile node may cease to operate at foreign agent 104 (e.g., the mobile node leaves the network of foreign agent 104), or the mobile node may exist at the foreign node beyond the time limit assigned to the network connection. It should be understood that the time limit assigned to the network connection is not the same and should not be confused with the lifespan of the security association. In fact, typically the lifespan of the security association is much longer than the lifetime assigned to the network connection.

Regardless of how the network connectivity was terminated, the mobile node is required to send another mobile network registration request to foreign agent 104 (e.g., a new mobile network registration request or a network re-registration request if it wishes to use the mobile network capability provided by foreign agent 104). Although not shown in FIG. 1A, upon termination of network connectivity security association manager 130 marks the security association entry in security association database 140 corresponding to mobile node 102 as idle. Similarly, upon termination of network connectivity security association manager 180 marks the security association entry in security association database 180 corresponding to mobile node 102 as idle.

Figure 1B:
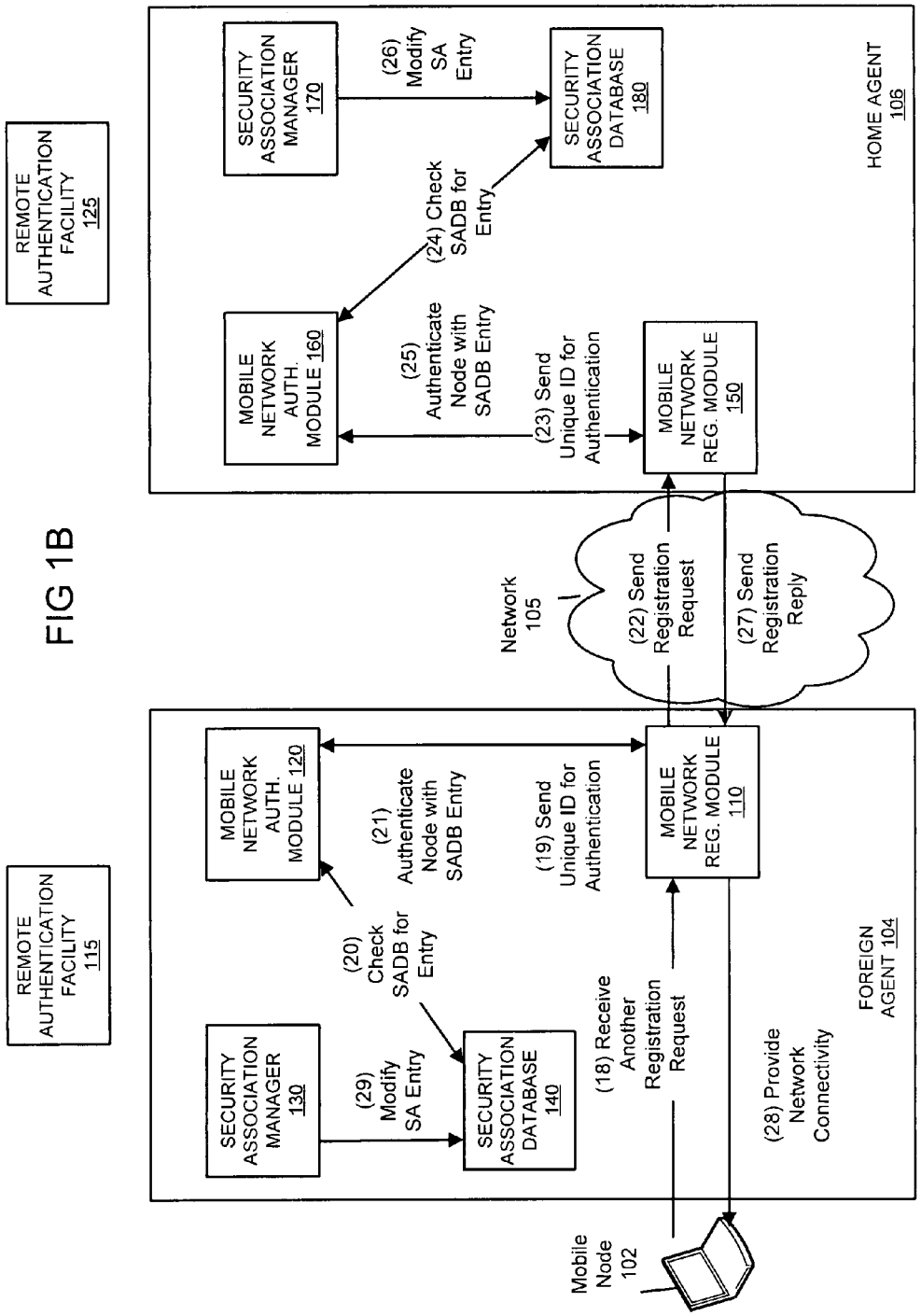
FIG. 1B is a data flow diagram illustrating an exemplary method of authenticating the mobile node upon receiving a subsequent registration request according to one embodiment of the invention.

FIG. 1B is a data flow diagram illustrating an exemplary method of authenticating the mobile node upon receiving a subsequent registration request according to one embodiment of the invention. At operation 18, the mobile node 102 (as described in FIG. 1A) sends another mobile network registration request to foreign agent 104 (i.e., a second mobile network registration request after termination of the previous network connectivity). Mobile network registration module receives the request along with a unique identifier of the mobile node (e.g., NAI) and sends this unique identifier to mobile network authentication module 120 at operation 19. At operation 20, mobile network authentication module checks security association database 140 for an entry corresponding to mobile node 102 (e.g., by using the unique identifier or NAI). Unlike the discussion in FIG. 1A, there is an entry in security association database that corresponds to mobile node 102. Therefore, at operation 21 mobile node 102 is authenticated with the security association stored in security association database 140.

By using the security association stored in the security association database, there is no need to retrieve a security association from remote authentication facility 115 as in FIG. 1A. Furthermore, a security association was not retrieved from remote authentication facility 115 upon receipt of subsequent mobile network registration requests. Thus the amount of time required to setup network connectivity is reduced and the network traffic and processing load required on the remote authentication facility is also reduced.

At operation 22, mobile network registration module 110 sends a mobile network registration request on behalf of mobile node 102 to mobile network registration module 150 on home agent 106. Included in this mobile network registration request is the unique identifier of the mobile node (e.g., NAI). At operation 23, the mobile network registration module sends that unique identifier to mobile network authentication module 160 to authenticate mobile node 102. At operation 24, mobile network authentication module 160 checks security association database 180 for a security association entry corresponding to that mobile node. Unlike the discussion in FIG. 1A, there is an entry in security association database 180 that corresponds to mobile node 102. Therefore, at operation 25 mobile node 102 is authenticated with the security association stored in security association database 140. At operation 26, the security association entry is modified from the idle state to an active state. More discussion regarding state transitions will be discussed with reference to FIG. 2. Although not shown in FIG. 1B, home agent 106 provides network connectivity to mobile node 102 by binding the Care-of-Address (CoA) associated with the mobile node to the mobile node's home address.

By using the security association stored in the security association database, there is no need to retrieve a security association from remote authentication facility 125 as in FIG. 1A. Furthermore, a security association was not retrieved from remote authentication facility 125 upon receipt of subsequent mobile network registration requests. Thus the amount of time required to setup network connectivity is reduced and the network traffic and processing load required on the remote authentication facility is also reduced.

At operation 27, the mobile network registration module 150 sends a registration reply to the foreign agent 104 indicating that the mobile node is authorized for access. At operation 28, foreign agent 104 provides network connectivity to mobile device 102. At operation 29, the security association entry in security association database 140 that corresponds to mobile node 102 is modified from the idle state to an active state.

Figure 2:
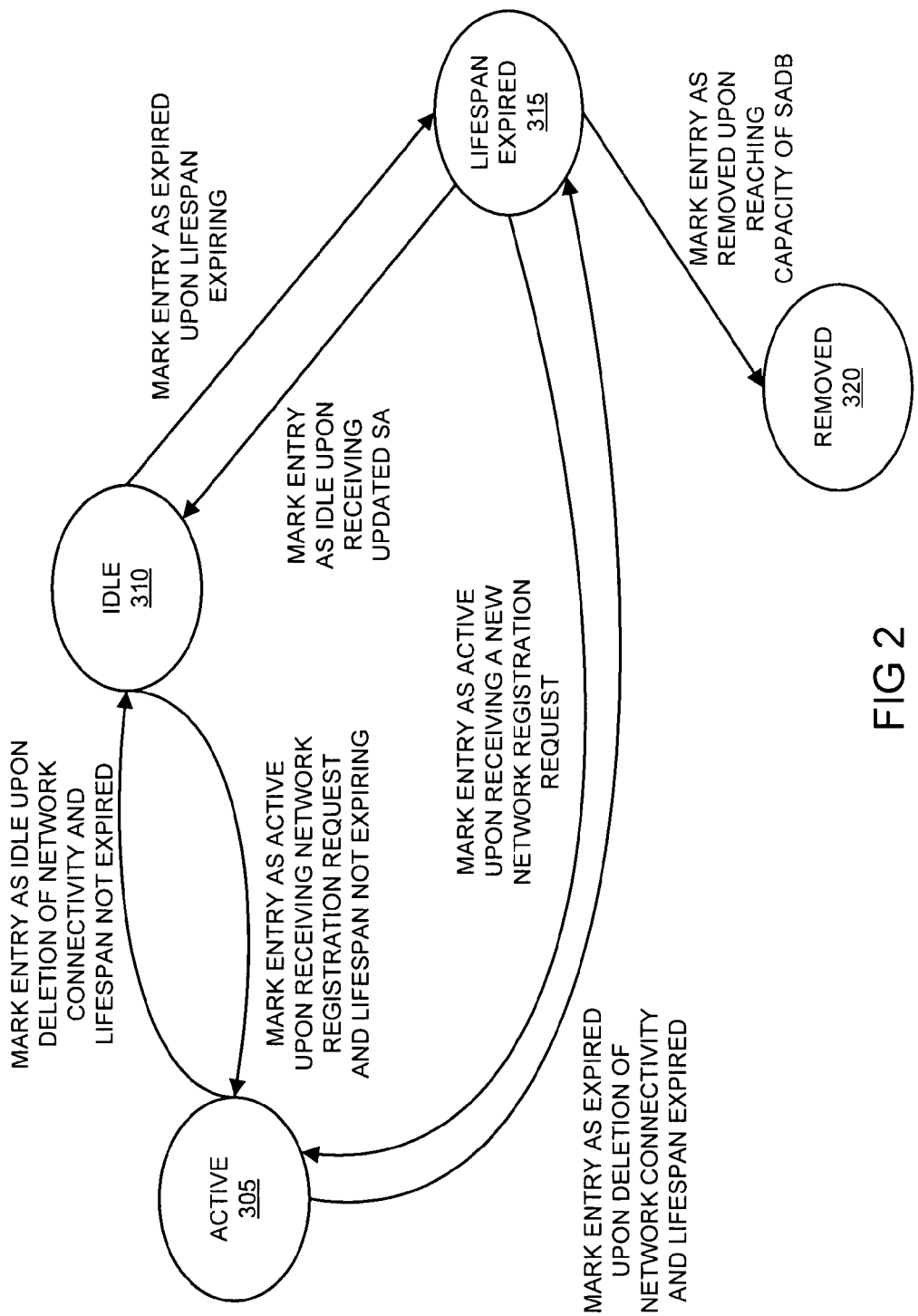
FIG. 2 is a data flow diagram illustrating exemplary state changes of a security association entry according to one embodiment of the invention.

FIG. 2 is a data flow diagram illustrating exemplary state changes of a security association entry according to one embodiment of the invention. FIG. 2 will be discussed with reference to the exemplary security association entries in FIG. 3. In FIG. 3, each entry in the security association database includes, but is not limited to, a network access identifier (NAI), the key used in authentication of the mobile node, a lifespan that the key is valid for, the last time this entry was used, and a state. Referring to FIG. 2, there are four states that a security association entry may have: active 305, idle 310, lifespan expired 315, and removed 320. Initially the security association entry is marked as active, and a timer for the lifespan will start. For example, in FIG. 3 the security association entry for Node 1 has a state that is marked as active and the lifespan indicates that 90 days are left until the lifespan expires.

Security association entries are modified from the active state 305 to the idle state 310 upon deletion of network connectivity (e.g., a mobile node sending a de-registration request, administrative action was taken, etc.) and the lifespan of the security association has not expired. For example, in FIG. 3 the security association entry for Node 2 has a state that is marked as idle and was last used twenty-three days ago.

Security associations are modified from the active state 305 to the lifespan expired state 315 upon deletion of network connectivity and the lifespan of the security association has expired. For example, in FIG. 3 the security association entry for Node 4 has a state marked as expired (note that the lifespan indicates that 0 out of 90 days remain). While in one embodiment of the invention the lifespan is reset if the lifespan expires while the network connectivity is still in use, in an alternative embodiment of the invention the state will be marked as lifespan expired once the network connectivity has been deleted.

Security association entries are modified from the idle state 310 to the active state 305 upon receiving a mobile network registration request while in the idle state and the lifespan not expiring. For example, in FIG. 3 the security association entry for Node 3 is marked as active and the lifespan indicates that 15 out of 90 days remain. Thus it is likely that this security association entry has been modified from the idle state to the active state (i.e., it is likely that a mobile network registration request was received while in the idle state). While in one embodiment of the invention the lifespan is not reset if the state is modified from the idle state 310 to the active state 305, in alternative embodiments of the invention different action is taken (e.g., the lifespan is reset to the original time, the lifespan is reset based on a local policy, the lifespan is reset based on a dynamic policy, etc.).

Security association entries are modified from the idle state 310 to the lifespan expired state 315 upon the lifespan expiring. For example, in FIG. 3 the security association entry for Node 4 has a state marked as expired (note that the lifespan indicates that 0 out of 90 days remain). Security association entries are modified from the lifespan expired state 315 to the removed state 320 upon a capacity of the security association database being met. The capacity of the security association database may be defined by a local policy on the foreign agent or home agent. Upon a security association entry being marked as removed, the security association is deleted from the security association database.

Security association entries are modified from the lifespan expired state 315 to the active state 305 upon receiving a new network registration request. According to one embodiment of the invention, even though the security association is marked as lifespan expired, the security association may be able to authenticate the mobile node. Thus, if authentication is successful, the security association is marked as active and the lifespan timer is restarted with the current lifespan value. According to another embodiment of the invention, if the security association cannot authenticate the mobile node (e.g., authentication fails) a new security association is downloaded from an external authentication facility and the existing security association entry is updated and marked as active.

Security association entries are modified from the lifespan expired state to the idle state upon the foreign agent or home agent receiving an updated security association. In one embodiment of the invention security associations are updated by a remote authentication facility (e.g., a AAA server) pushing out updated security associations (e.g., by using a Change of Authorization message). If the updated security association is received when the entry is marked with a state as lifespan expired, the entry is updated with the new key, the lifespan is reset, and the entry is marked as idle until a registration request is received. In another embodiment of the invention, security associations are updated by a triggering of a new security association if authorization fails with the key currently included with the security association entry. For example, if a registration request is received from a mobile node while the security association entry for that mobile node is marked with a state as lifespan expired, the security association key may not be successful in authenticating that mobile node. In such a case, according to one embodiment of the invention a new security association entry will be downloaded from a remote authentication facility and that new security association entry will be used in authenticating that mobile node. An updated security association may also reset the lifespan (or change the lifespan) associated with that security association regardless of the current state of the security association entry.

Security association entries that are marked in the active state or the idle state are likely able to provide authentication for the corresponding mobile node as the lifespan of the security association has not yet expired. Thus, unless authentication is unsuccessful, using a security association entry stored in a local security association database to provide authentication of a mobile node without having to access a remote authentication facility (e.g. a AAA server) reduces the amount of time required for providing network connectivity, reduces the amount of network traffic, and reduces the processing load on the remote authentication facility.

Figure 4A:
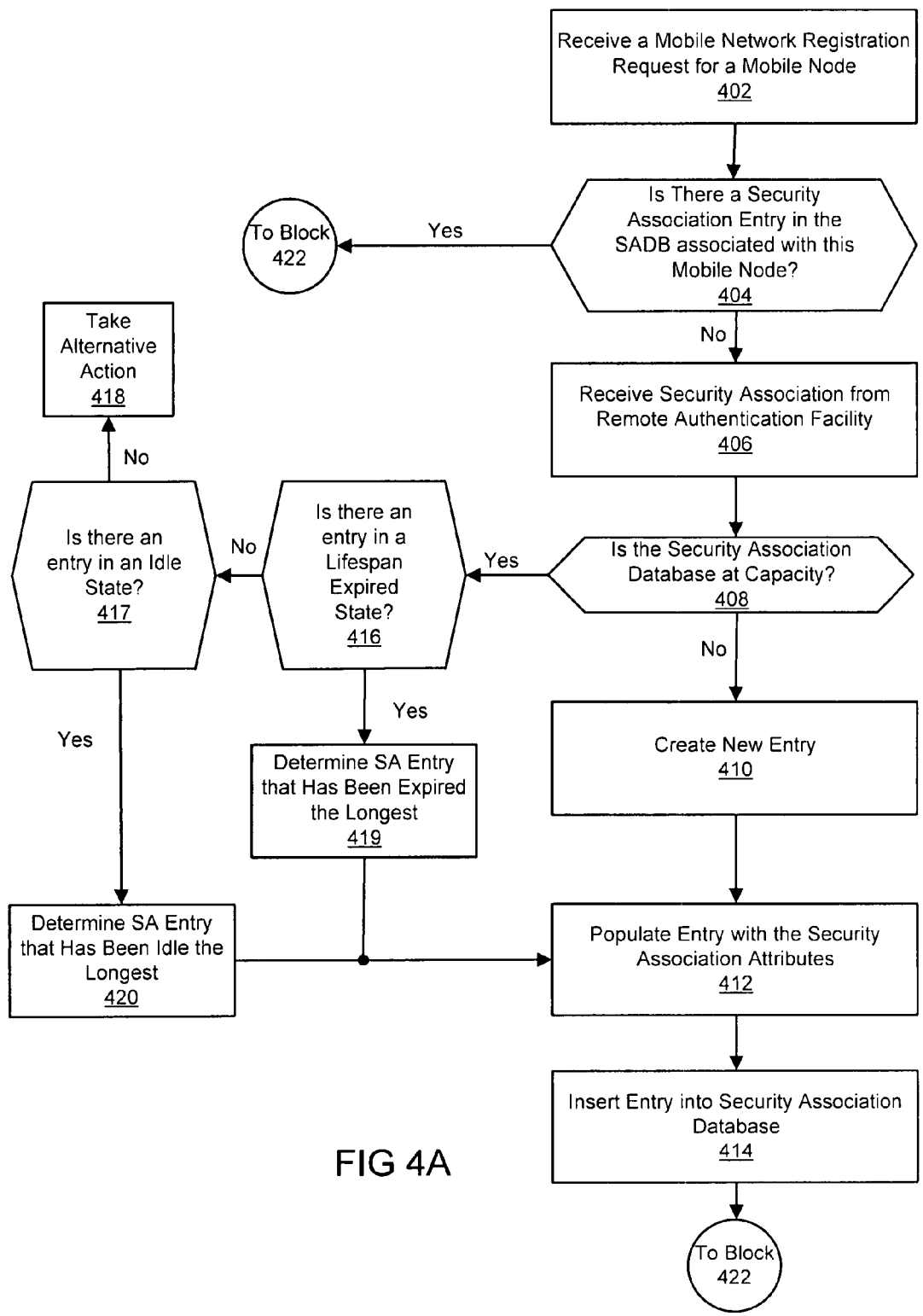
FIG. 4A is a flow diagram illustrating an exemplary method of authenticating a mobile node upon receiving a mobile network registration request for a mobile node according to one embodiment of the invention.
Figure 4B:
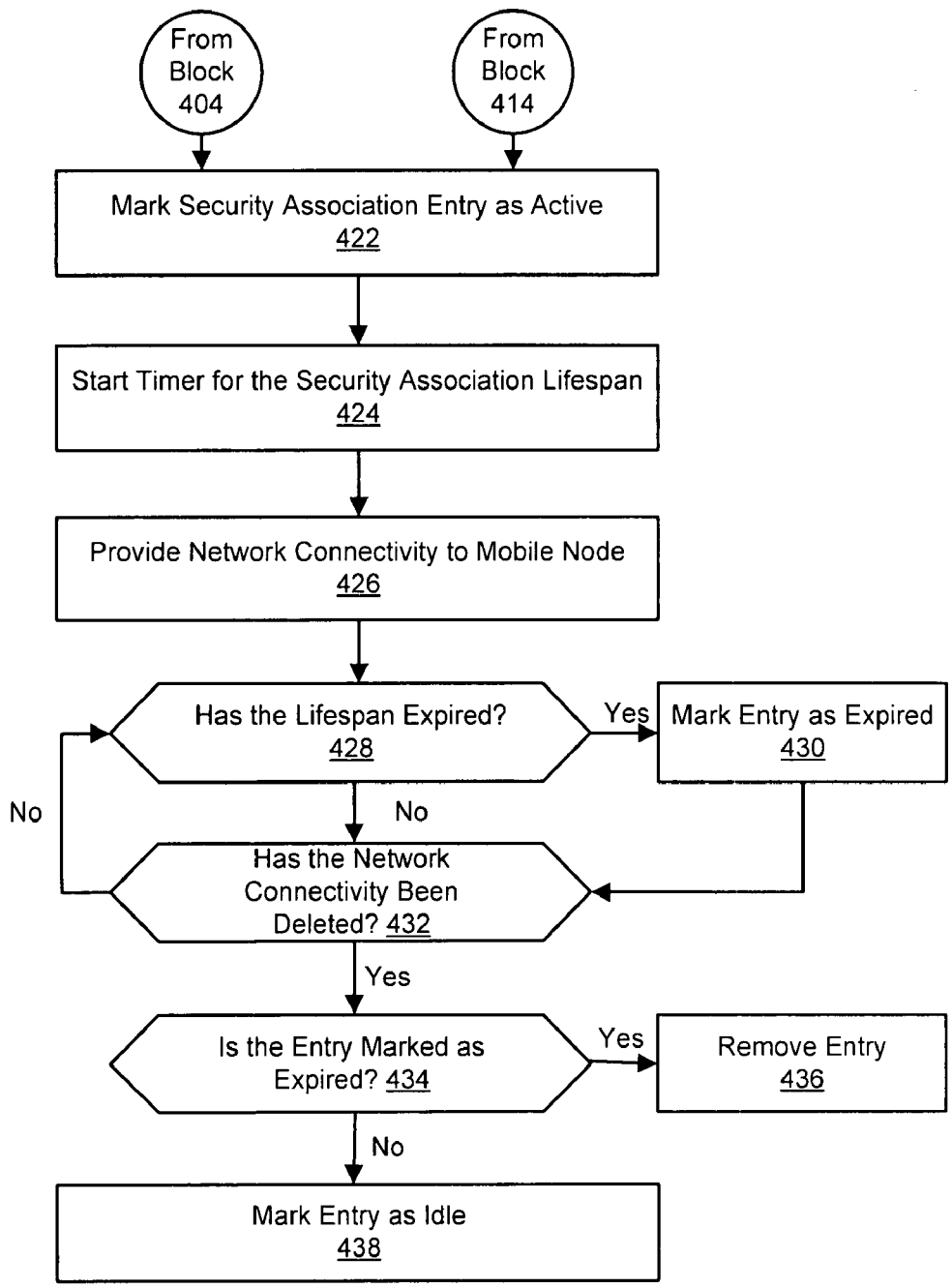
FIG. 4B is a flow diagram illustrating an exemplary method of authenticating a mobile node upon receiving a mobile network registration request for a mobile node according to one embodiment of the invention.

FIGS. 4A and 4B are flow diagrams illustrating an exemplary method of authenticating a mobile node upon receiving a mobile network registration request for a mobile node according to one embodiment of the invention. The steps taken in FIGS. 4A and 4B can be performed similarly by a home agent as well as a foreign agent. While the flow diagrams in FIGS. 4A and 4B show a particular order of operations performed by certain embodiments of the invention, it should be understood that such order is exemplary (e.g., alternative embodiments may perform the operations in a different order, combine operations, overlap certain operations, etc.).

A mobile network registration request for a mobile node is received at block 402. While in one embodiment of the invention the mobile network registration request is a mobile IP registration request, in alternative embodiments of the invention different mobile network registration requests may be received (e.g., for other protocols other than IP). At block 404, a determination is made to determine if there is a security association entry in the security association database associated with this mobile node. If there is such an entry, then flow moves to block 422 which is described with reference to FIG. 4B. If there is not an entry, flow moves to block 406. At block 406, a security association is retrieved from a remote authentication facility and flow moves to block 408.

A determination is made whether the security association database is at capacity at block 408. As previously described, the capacity of the security association database may be defined by a local policy. If the security association database is at capacity then control moves to block 416. As the security association database is at capacity (i.e., no new entries can be added, an entry has to be replaced) at block 416 a determination is made to determine if there is an entry in the security association database that is in a lifetime expired state. If there is an entry that is in the lifetime expired state the entry that has been expired the longest is chosen for replacement at block 419. If there is not an entry that is in the lifetime expired state, control flows to block 417. At block 417 a determination is made to determine whether there is an entry in the security association database that is in an idle state. If there is an entry that is in the idle state, the entry that has been idle the longest is chosen for replacement at block 420. If there are no entries in an idle state, then control moves to block 418 where alternative action is taken. While in one embodiment of the invention such alternative action may locally cache the security association and use that security association until the network connectivity is deleted, in alternative embodiments of the invention other action is taken (e.g., the local policy defining the capacity is modified to include adding additional security associations based on a certain time of day, a count is added to a capacity increaser where upon reaching a certain predefined number the capacity will be increased, etc.). If there is an entry in an idle state the entry that has been idle the longest is chosen for replacement at block 420.

If the security association database was not at capacity (meaning new entries may be added) a new entry is created at block 410. At block 412, the entry is populated with the security association attributes and at block 414 the entry is inserted into the security association database and control flows to block 422. At block 422 (FIG. 4B) the security association entry is marked as active. Note that if the flow originated from block 404 a security association entry already existed for this mobile node. Thus, the security association entry for this mobile node was either marked as idle or marked as lifespan expired. If the flow originated from block 414, a security association entry was newly added and had no initial state.

At block 424 the timer for the lifespan of the security association is started and at block 426 network connectivity is provided to the mobile node. At block 428 a determination is made whether the lifespan has expired. According to one embodiment of the invention if the lifespan is expired but network connectivity has not been deleted, the lifespan timer is restarted. According to another embodiment of the invention, if the lifespan is expired the flow moves to block 430 regardless of the status of network connectivity where the entry is marked as expired and flow moves to block 432. If the lifespan has not expired, then flow moves to block 432. At block 432 a determination is made to determine whether network connectivity has been deleted. If network connectivity has not been deleted, control moves back to block 428. If network connectivity has been deleted then flow moves to block 434. At block 434, a determination is made to determine whether the entry is marked as expired. If the entry is marked as expired, then according to one embodiment of the invention the entry is removed at block 436. According to another embodiment of the invention, if the entry is marked as expired the expired entry remains in the security association database until capacity of that security association database has been reached. If the entry is not marked as expired, then the entry is marked as idle at block 438.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method in a foreign agent comprising:
    in response to a first mobile network registration request from a mobile node, accessing a remote authentication facility to retrieve a security association for the mobile node for authenticating and providing a first network connectivity to the mobile node, wherein the security association is associated with a lifespan that specifies the time period in which the security association will be valid;
    inserting the security association in a local security association database in the foreign agent to create a security association entry that is active, wherein the security association entry includes the lifespan;
    transmitting the first mobile network registration request to a home agent;
    responsive to receiving from the home agent a first authentication reply that indicates that the mobile node is authenticated, providing the mobile node with the first network connectivity by binding a first Care-of-Address for the mobile node to a home address associated with the mobile node;
    terminating the first network connectivity including removing the binding of the first Care-of-Address and the home address;
    responsive to the step of terminating the first network connectivity, modifying the security association entry to indicate that the security association is idle;
    receiving a second mobile network registration request from the mobile node after the first network connectivity has been terminated;
    responsive to determining that the lifespan associated with the security association is valid, using the security association entry in the local security association database that corresponds to the mobile node to provide authentication of the mobile node without having to access the remote authentication facility;

transmitting the second mobile network registration request to the home agent; and responsive to receiving from the home agent a second authentication reply that indicates that the mobile node is authenticated, providing the mobile node with a second network connectivity by binding a second Care-of-Address for the mobile node to the home address associated with mobile node, and modifying the security association entry to indicate that the security association is active.

2. The computer implemented method of claim 1 wherein the first and second mobile network registration requests are mobile internet protocol (IP) registration requests.

3. The computer implemented method of claim 1 wherein the lifespan is determined by a local policy or is included with security association, and wherein the security association is retrieved from an authentication, authorization, and accounting (AAA) device.

4. The computer implemented method of claim 1 further comprising, receiving an updated security association for the mobile node and updating the security association entry in the security association database according to the updated security association; and upon the security association entry failing to provide authentication of the mobile node, requesting a different security association to provide authentication of the mobile node.

5. The computer implemented method of claim 1 further comprising:

marking the security association as active upon providing the first network connectivity; and marking the security association entry as expired upon the lifespan expiring.

6. The computer implemented method of claim 5 further comprising, removing the security association entry upon the security association entry not marked as active and the lifespan expiring; and removing the security association entry upon reaching a capacity of the security association database and the security association entry is not marked as active and the security association entry is the least recently used.

7. The computer implemented method of claim 6 wherein the capacity of the security association database is defined by a local policy.

8. A network element, comprising:

one or more processors; and a non-transitory computer-readable medium that stores software, said software comprising:

a security association database to store a set of one or more security associations, wherein each of the set of security associations is associated with a different mobile node, and wherein each of the set of security associations is associated with a lifespan that specifies the time period in which the security association will be valid;

a mobile network registration module to, receive a network registration request for one of the different mobile nodes, cause an authentication of that mobile node to be performed by a mobile network authentication module, and provide network connectivity to that mobile node upon successful authorization including binding a Care-of-Address for that mobile node to a home address associated with that mobile node;

the mobile network authentication module to authenticate the one of the different mobile nodes with the one of the set of security associations stored in the security association database that is associated with that mobile node without having to access a remote authentication facility to retrieve the security association as long as that security association is not expired; and a security association manager coupled with the security association database, the security association manager to modify the security association entry corresponding to that mobile node in the security association database depending on a current state of the security association, wherein the security association manager is to mark the security association as active upon successful network connectivity, and wherein the security association manager is to mark the security association as idle upon termination of network connectivity and the lifespan not expiring.

9. The network element of claim 8, wherein the security association manager further removes the security association from the security association database upon the security association entry not marked as active and the lifespan expiring if a capacity of the security association database is met.

10. The network element of claim 8, wherein if the authentication of the one of the different mobile nodes is not successful, then the mobile network authentication module causing a different security association to be retrieved from the remote authentication facility.

11. The network element of claim 8, wherein the security association manager further to receive an updated security association for that mobile node and updating the security association entry in the security association database according to the updated security association.

12. The network element of claim 8, wherein successful network connectivity includes creation of a binding for that mobile node that includes a temporary network address of that mobile node, and wherein deletion of network connectivity includes removing the binding.

13. The network element of claim 8 wherein the security association manager further to insert received security associations into the security association database.

14. The network element of claim 8, wherein the security association manager further to remove the security association entry upon reaching a capacity of the security association database and the security entry is not marked as active and the security association entry is the least recently used.

15. The network element of claim 14, wherein the capacity of the security association database is defined by a local policy.

16. A non-transitory machine-readable medium that provides instructions that, if executed by a processor on a foreign agent, will cause said processor to perform operations comprising:

in response to a first mobile network registration request from a mobile node, accessing a remote authentication facility to retrieve a security association for the mobile node for authenticating and providing a first network connectivity to the mobile node, wherein the security association is associated with a lifespan that specifies the time period in which the security association will be valid;

inserting the security association in a local security association database in the foreign agent to create a security association entry that is active, wherein the security association entry includes the lifespan;

transmitting the first mobile network registration request to a home agent;

responsive to receiving from the home agent a first authentication reply that indicates that the mobile node is authenticated, providing the mobile node with the first network connectivity by binding a first Care-of-Address for the mobile node to a home address associated with the mobile node;

terminating the first network connectivity including removing the binding of the first Care-of-Address and the home address;

responsive to the step of terminating the first network connectivity, modifying the security association entry to indicate that the security association is idle;

receiving a second mobile network registration request from the mobile node after the first network connectivity has been terminated;

responsive to determining that the lifespan associated with the security association is valid, using the security association entry in the local security association database that corresponds to the mobile node to provide authentication of the mobile node without having to access the remote authentication facility;

transmitting the second mobile network registration request to the home agent; and responsive to receiving from the home agent a second authentication reply that indicates that the mobile node is authenticated, providing the mobile node with a second network connectivity by binding a second Care-of-Address for the mobile node to the home address associated with mobile node, and modifying the security association entry to indicate that the security association is active.

17. The non-transitory machine-readable medium of claim 16 wherein the first and second mobile network registration requests are mobile internet protocol (IP) registration requests.

18. The non-transitory machine-readable medium of claim 16 wherein the lifespan is determined by a local policy or is included with security association, and wherein the security association is retrieved from an authentication, authorization, and accounting (AAA) device.

19. The non-transitory machine-readable medium of claim 16 further comprising, receiving an updated security association for the mobile node and updating the security association entry in the security association database according to the updated security association; and upon the security association entry failing to provide authentication of the mobile node, requesting a different security association to provide authentication of the mobile node.

20. The non-transitory machine-readable medium of claim 16 further comprising:

marking the security association as active upon providing the first network connectivity; and marking the security association entry as expired upon the lifespan expiring.

21. The non-transitory machine-readable medium of claim 20 further comprising, removing the security association entry upon the security association entry not marked as active and the lifespan expiring; and removing the security association entry upon reaching a capacity of the security association database and the security association entry is not marked as active and the security association entry is the least recently used.

22. The non-transitory machine-readable medium of claim 21 wherein the capacity of the security association database is defined by a local policy.

* * * * *

UNITED STATES PATENT AND TRADEMARK OFFICE
CERTIFICATE OF CORRECTION

| | |
|---|---|
| PATENT NO. | : 8,166,527 B2 |
| APPLICATION NO. | : 11/985801 |
| DATED | : April 24, 2012 |
| INVENTOR(S) | : Wen et al. |

It is certified that error appears in the above-identified patent and that said Letters Patent is hereby corrected as shown below:

On Title Page 2, in Item (56), under "OTHER PUBLICATIONS", in Column 2, Line 3, delete "(RFc" and insert -- (RFC --, therefor.

In Column 11, Line 24, in Claim 4, delete "comprising," and insert -- comprising: --, therefor.

In Column 11, Line 40, in Claim 6, delete "comprising," and insert -- comprising: --, therefor.

In Column 14, Line 11, in Claim 19, delete "comprising," and insert -- comprising: --, therefor.

In Column 14, Line 27, in Claim 21, delete "comprising," and insert -- comprising: --, therefor.

Signed and Sealed this
Fourth Day of September, 2012

David J. Kappos
*Director of the United States Patent and Trademark Office*